L. P. HYNES.
THERMO ELECTRIC REGULATOR.
APPLICATION FILED JUNE 7, 1915.
1,246,927.
Patented Nov. 20, 1917.
3 SHEETS—SHEET 2.
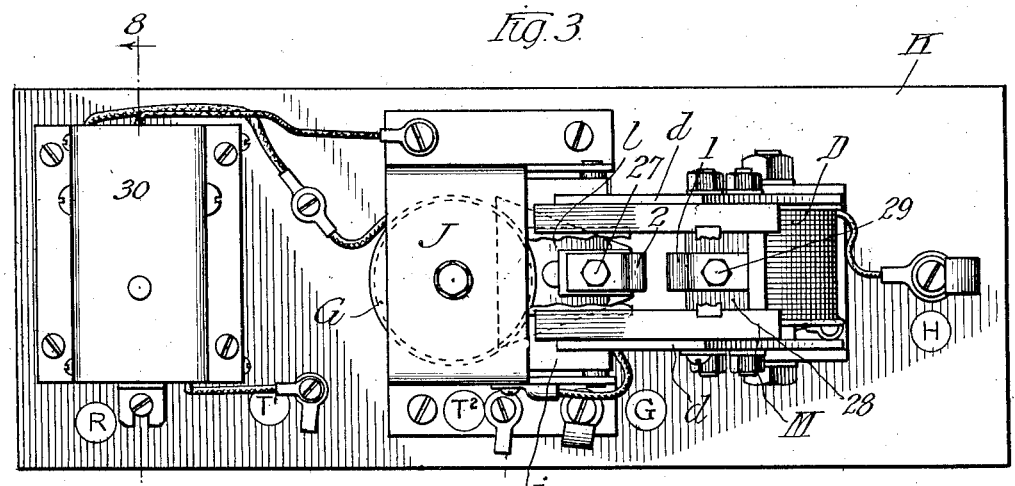
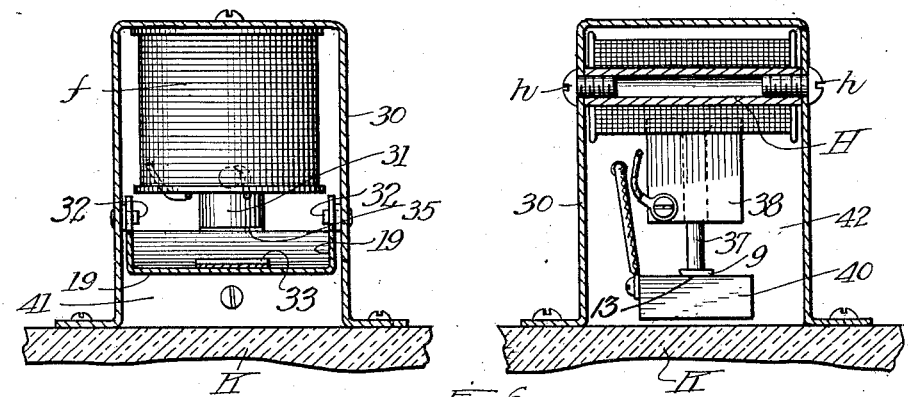
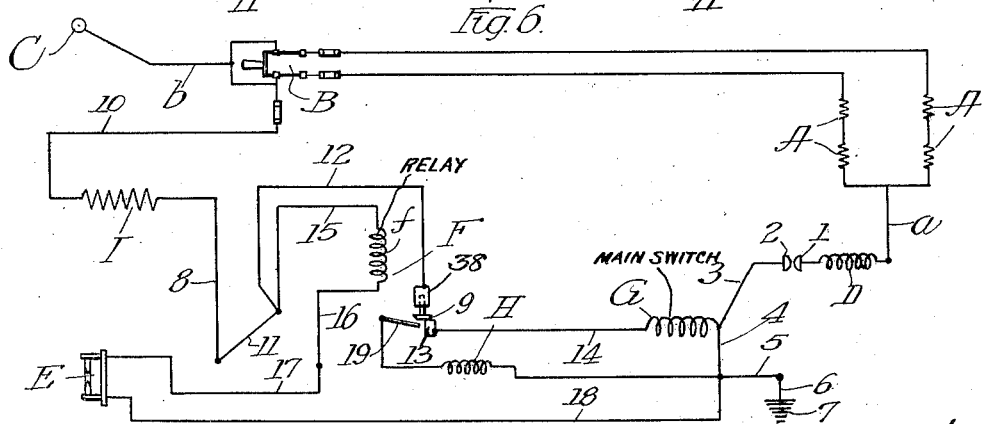
Witnesses:
Robert H. Weir
Arthur W. Carlson
Inventor
Lee P. Hynes
By Arthur L. Durand
Atty.

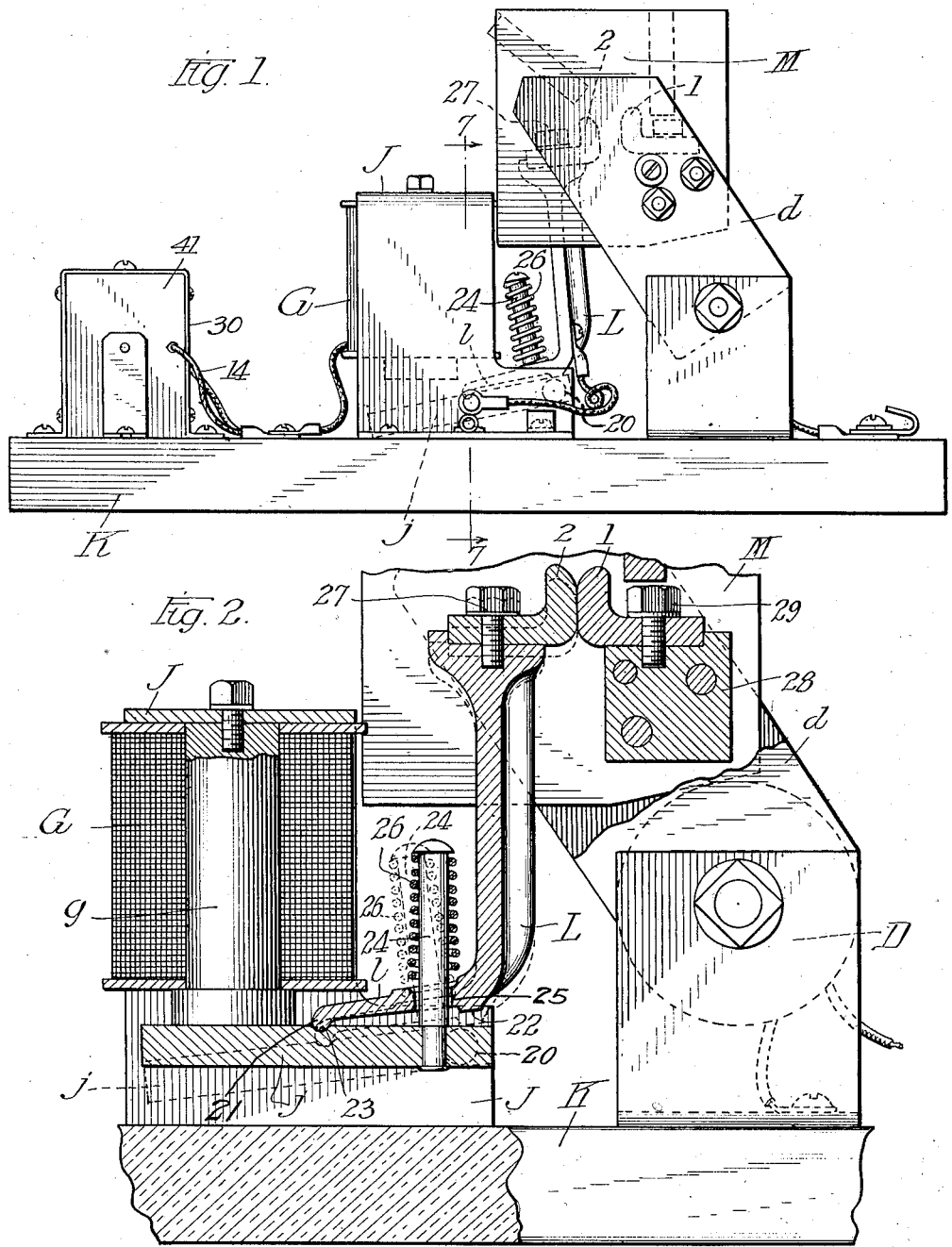

L. P. HYNES.
THERMO ELECTRIC REGULATOR.
APPLICATION FILED JUNE 7, 1915.
1,246,927.
Patented Nov. 20, 1917.
3 SHEETS—SHEET 3.
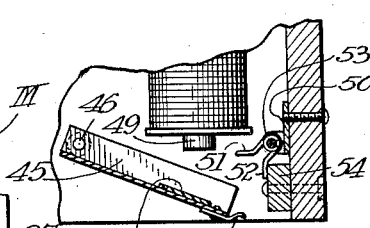
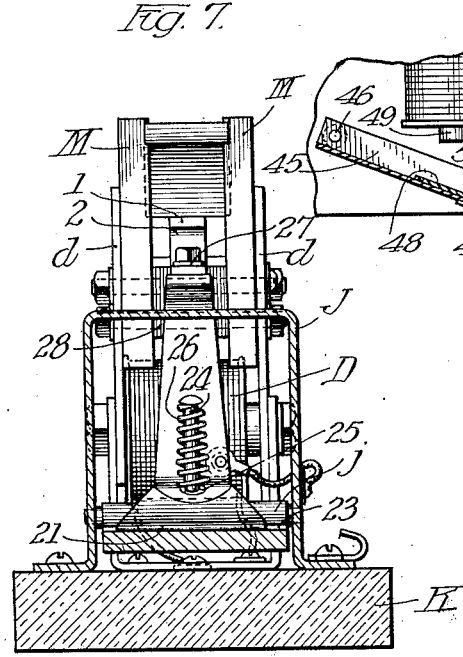
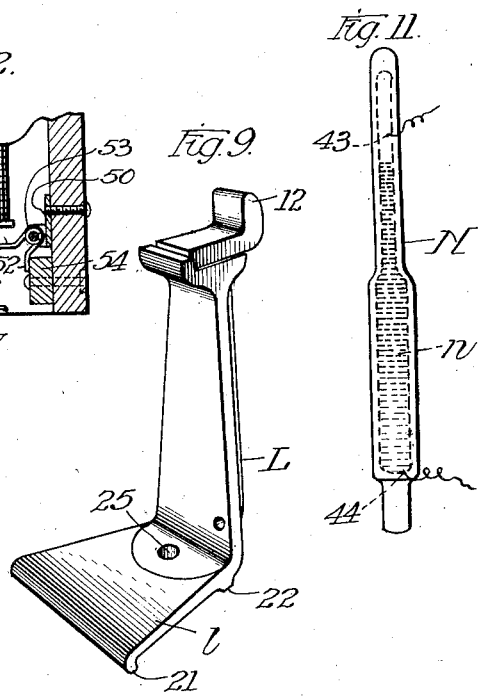
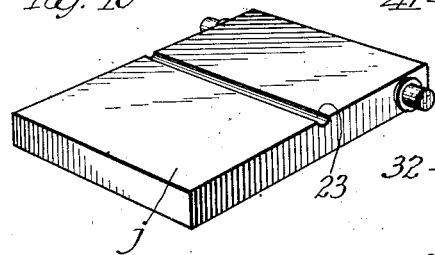
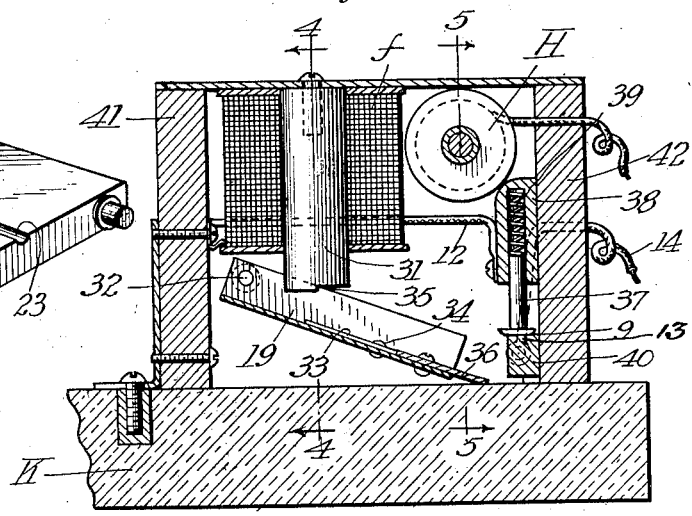
Witnesses:
Robert F. Weir
Arthur W. Carlson
Inventor
Lee P. Hynes
By Arthur F. Durand
Atty.

UNITED STATES PATENT OFFICE.

LEE P. HYNES, OF CHICAGO, ILLINOIS, ASSIGNOR TO THERMO ELECTRIC REGULATOR CO., OF CHICAGO, ILLINOIS, A CORPORATION OF ILLINOIS.

THERMO-ELECTRIC REGULATOR.

1,246,927.  Specification of Letters Patent.  Patented Nov. 20, 1917.

Application filed June 7, 1915. Serial No. 32,567.

*To all whom it may concern:*

Be it known that I, LEE P. HYNES, a citizen of the United States of America, and resident of Chicago, Cook county, Illinois, 7320 Princeton avenue, residence address, where I am now living and receive mail, have invented a certain new and useful Improvement in Thermo-Electric Regulators, of which the following is a specification.

My invention relates to thermo-electric regulators in general, but more particularly to those for automatically regulating the temperature of a room, and especially to those for regulating the electric heating apparatus of a car.

Generally stated, the object of my invention is to provide a novel and highly efficient thermo-electric regulator of this general character.

A special object is to provide an arrangement in which there is no permanent ground which will retard the deënergizing of the thermostatically controlled main-switch when the circuit is again broken.

A further object is to arrange the necessary circuits in such manner that the thermostat will advantageously close the circuit on high current and then open the circuit on low current.

Another object is to arrange the circuits and instrumentalities in such manner that an accidental ground on the heater will not burn out or endanger the main-switch that controls the supply of current for heating purposes.

Another object is to dispense with the use of certain principles and features of construction heretofore considered necessary or desirable in an apparatus for this purpose.

It is also an object to provide certain details and features of construction and combinations tending to increase the general efficiency of a thermo-electric regulator of this particular character.

To these and other useful ends my invention consists in matters hereinafter set forth and claimed.

In the accompanying drawings—

Figure 1 is a side elevation of the main switch that controls the supply of current to the heaters, and the operation of which is controlled by the thermostat through the medium of the relay shown in side elevation, the said devices being all mounted on a base.

Fig. 2 is an enlarged detail sectional view of a portion of said switch, showing the same energized and in operated position in full lines, and in partially operated position in dotted lines, thus illustrating the sliding or wiping action of the movable circuit-closing contact on the stationary contact.

Fig. 3 is a plan of the switch shown in Fig. 1.

Fig. 4 is a vertical transverse section on line 4—4 in Fig. 8.

Fig. 5 is a similar section on line 5—5 in Fig. 8.

Fig. 6 is a diagram of the circuit arrangement involved in a thermo-electric regulator embodying the principles of my invention.

Fig. 7 is a vertical transverse section on line 7—7 in Fig. 1.

Fig. 8 is a section on line 8—8 in Fig. 3.

Fig. 9 is a perspective of the armature-arm of the main-switch.

Fig. 10 is a similar view of the armature of said switch.

Fig. 11 is a side elevation of a mercury thermostat suitable for use in a system embodying the principles of my invention.

Fig. 12 shows a preferred form of relay contacts.

As thus illustrated, my invention comprises heaters A of any suitable known or approved character connected in multiple between the conductor *a* and the hand switch B, which latter is in turn connected by a conductor *b* with the trolley C of the car, so that the heaters have a connection to a source of current. (See Fig. 6.) Current for heating purposes passes from said trolley through the heaters and the conductor *a* to the blow-out coil D, then through the contacts 1 and 2 of the socalled main-switch, then through the conductors 3, 4, 5 and 6 to the ground 7, thus heating the car. The said main switch is automatically controlled to open and close the contacts 1 and 2, the opening of said contacts serving to break the heating circuit at a point between the heaters and ground when it is desired to turn off the heat, the car having become too warm, and the closing of these contacts by the lowering of the temperature of the car serving afterward to turn on the heat when a higher temperature is needed. Thus the main switch or contactor is in the connection to ground, instead of in the connection from the heaters to the source of current. The thermo-electric regulator comprises also a thermostat E of any suitable character for controlling the circuit of the relay F, which latter controls not only the energizing circuit of the main-switch electro-magnet coil G, but also the shunt circuit around the said coil, which shunt includes the resistance H of any suitable character. A heavy resistance I is connected between the trolley side of the switch B and the conductor 8, which latter is suitably connected with the relay coil $f$ and the relay contact 9, said relay coil and contact being connected in multiple or having a parallel circuit arrangement when the relay is energized. Preferably the coil G of the main switch has a resistance of about 875 ohms, under the conditions which ordinarily prevail in trolley car practice, and the relay coil $f$ has a resistance of about 1,275 ohms, while 50 ohms resistance is sufficient for the resistance coil H under ordinary conditions. The heavy resistance I may be of 4,000 ohms resistance, and with this arrangement there will be a proper proportioning of the current in the circuits during the use of the electric heaters.

Assuming that the temperature of the car is a little below normal, so that the temperature is rising, the operation is as follows: While the temperature is rising the current is flowing from the trolley C through the heaters A to the ground 7 in the manner previously described. During this time the contacts 1 and 2 are closed, of course, by reason of the fact that the coil G which operates these contacts is energized over a circuit from the trolley C over the conductors $b$ and 10, through the heavy resistance I, over the conductors 8, 11 and 12, through the relay contacts 9 and 13 (these contacts being closed as the relay is not energized at this time) over the conductor 14, through the main-switch coil G, and then over the conductors 4, 5 and 6 to the ground 7, thereby keeping the heating circuit closed. When the circuit is closed at the thermostat E, a circuit is thereby formed from the trolley C over the conductors $b$ and 10, through the resistance I, over the conductors 8, 11 and 15, through the relay coil $f$, over the conductors 16 and 17 to the thermostat E, through the closed contacts of said thermostat, over the conductor 18, and then over the conductors 5 and 6 to the ground 7, whereby the said relay F is instantly energized. The energizing of said relay causes its armature 19 to engage the movable contact 9, thus closing a shunt around the switch coil G, this shunt including the resistance H, and the current flowing in the main-switch coil E being materially reduced. The operation of the armature 19 lifts the contact 9 from the stationary contact 13, thereby opening the previously described circuit through the coil G, and thus totally deënergizing the main-switch. This causes the contacts 1 and 2 of the main switch to separate, and in this way the heating circuit is automatically opened when the rising temperature causes the thermostat to close the energizing circuit of the relay, which latter in turn controls the energizing circuit of the main-switch.

The circuit arrangement shown and described has certain advantages, as there is an advantageous proportioning of the current in the different circuits, which tends to prevent injury to the various instrumentalities, and which renders the apparatus more satisfactory and efficient in use, as will be readily understood by those skilled in the art. For example, and with the circuit arrangement shown and described, there is no permanent path to ground from the trolley through the heaters, of course, nor is there a permanent path to ground through any of the other instrumentalities shown and described; and as there is no permanent path to ground through the main switch, it follows that there is nothing to retard the deënergizing of the main switch when the circuit through the thermostat is closed. Again, the resistance H is also in shunt of the thermostat and the relay coil $f$, when the relay is energized, thereby materially reducing the current-flow in the thermostat during the time that the heating circuit is open. This, it will be seen, allows the thermostat to close on high current and open on low current, thus tending to reduce sparking, which is important when mercury is used in the thermostat for opening and closing the circuit. Furthermore, and with the arrangement shown and described, the heaters are not in circuit with the trolley and ground at a point between said ground and the contacts of the main-switch, but to the contrary are located in the heating circuit at a point between said contacts and the trolley, whereby an accidental ground on the heaters will not result in injuring the main-switch. Also, and with the heavy resistance I located at a point remote from the switchboard upon which are mounted the relay and the main-switch and the blow-out D and the resistance H, which arrangement is employed in practice, there is then no danger of the current being short circuited by jumping from the said resistance I to any of the instrumentalities on said switch-board.

The circuit arrangement thus shown and described may be employed in conjunction with a main switch and a relay of any suitable known or approved character. However, and as a matter of further and special improvement, and with a view to insuring the previously described method of operation, the said switch and relay are preferably constructed as follows:

Referring to Figs. 1 and 2, the said main switch comprises the coil G (shown in Fig. 6) which has a vertically disposed core $g$, the upper end of said core being supported by an inverted U-shaped bracket J, and said bracket having the lower ends thereof mounted upon the base or switchboard K, which latter is preferably of fire resisting and insulating material. The armature $j$ is pivoted at 20 on the base portions of the bracket J, and between the upright side portions of said bracket, whereby said armature normally rests upon the switchboard K but is raised against the lower end of the core $g$ by the energizing of the coil G, thereby rocking the armature about a horizontal axis. The arm L (see Fig. 9) has a foot $l$ provided with ribs 21 and 22 on the lower side thereof, the rib 21 engaging the groove 23 in the top of the armature $j$, and the rib 22 normally resting upon the top of said armature above the axis thereof. Said armature is provided with an upstanding post 24 which extends through an opening 25 in the lower end portion of the arm L, and which is provided with a spring which bears upon the foot $l$ to yieldingly hold the latter and the arm L in normal position on the armature. The upper portion of said arm is provided with the contact 2 of brass or copper, which contact is removably secured to the said arm by a screw 27, or by other suitable means. The other contact 1 (see Fig. 6) is mounted upon a metal block 28 by means of a screw 29, and these two contacts are normally separated in the manner shown in Fig. 1; but when the hand switch B is closed to turn on the heat the circuit previously described through the coil G is closed, and the contacts 1 and 2 are thereby brought together. The arrangement, it will be seen, is such that the contact 2 engages the contact 1 before the armature $j$ engages the lower end or pole piece of the core $g$, and as the opening 25 is larger than the post 24, the continued movement of said armature operates to compress the spring 26 and to separate the rib 22 from the pivoted portion of the armature, as shown in Fig. 2, whereby the contact 2 is caused to slide upward upon the contact 1 in the manner indicated. When the magnet coil G is deenergized, the armature $j$ first drops to the position shown in dotted lines in Fig. 2, thereby sliding the contact 2 downward on the contact 1, before the heating circuit is opened between these contacts, thus giving a wiping effect between the two contacts which is beneficial for obvious reasons. The armature $j$ finally drops to the position shown in Fig. 1, thereby separating the contacts 1 and 2 and opening the heating circuit. These two contacts 1 and 2 are preferably inclosed in a boxing or housing M constructed from sections of asbestos board, arranged in any suitable manner, whereby sparking between said contacts, should this occur, will not be liable to set fire to the immediate surroundings, this housing forming a sort of chimney for the flame of the spark. Furthermore, the blow-out coil D, which is suitably mounted on the base K adjacent the main-switch, is provided with flat pole pieces $d$ which are arranged in vertical planes, and which are spaced apart to embrace and support the block 28 and the housing M in any suitable manner. With this arrangement, the pole pieces $d$ provide a magnetic field for blowing out the spark between the contacts 1 and 2, it being observed that these contacts are disposed directly between the upper ends of said pole pieces.

Referring to Figs. 4, 5, 7 and 8, the construction and operation of the relay F (see Fig. 6) are as follows: An inverted U-shaped sheet metal bracket 30 is secured to the base or switchboard K in any suitable manner, and the coil $f$ has a vertically disposed core 31 secured at its upper end to the underside of the top portion of said bracket. The armature 19 is of sheet metal, such as sheet iron, and is trough shaped in cross section, as shown in Fig. 4, being pivoted at 32 to the side portions of the inverted U-shaped support. A springy piece of soft sheet iron 33 is fixed on the top of said armature by one or more rivets 34, and the free end portion of this strip of sheet iron is received in the offset or recess 35 formed in one-half of the lower end portion of the magnet core. The copper contact 36 is suitably secured to the free end of said armature and arranged in position to engage the contact 9 when the relay is energized. This contact 9 forms the head for the lower end of the vertically disposed metal pin 37 which slides up and down in the metal block 38, a spring 39 being inclosed in said block and arranged to bear against the upper end of said pin to keep the contact 9 normally in engagement with the stationary contact 13 (see Fig. 6) previously described. When the relay is energized the armature contact 36 engages the edge portion of the contact 9, thereby lifting the latter from the contact 13 on the block 40, and causing the contact 36 to slide under the head-shaped contact 9 while the armature is moving upward to engage the core of the relay magnet. Thus the circuit is closed between 9 and 36, in the manner previously described, before the circuit is opened between 9 and 13, thereby shunting the main-switch before the circuit of the latter is broken. When the relay coil $f$ is deenergized, the armature 19 starts to fall back to normal position, thus allowing the contact 9 to reëngage the contact 13, and during this time the soft iron strip 33 is flexed by the residual magnetism, as it endeavors to break away from the offset 35 at the lower end of the pole piece, and this is found to facilitate the operation of the relay. Preferably, and as a matter of compact and convenient structure, the resistance H is disposed horizontally between the relay magnet and the upper end of the metal block 38, the ends of this resistance being secured to the sides of the inverted U-shaped support by screws $h$ or other suitable means. (See Fig. 5.) With this arrangement the relay and resistance are combined in one unitary structure, it being observed that the ends of the housing formed by the inverted U-shaped member 30 are closed by strips of insulation 41 and 42 of any suitable character.

It will be understood that the electrical connections for the said main-switch and relay, and for the other instrumentalities of the apparatus, can be of any suitable character, and can be arranged in any suitable manner with a view to carrying out the circuit arrangement shown in Fig. 6, as previously described.

A thermostat is shown in Fig. 11, the construction of which is as follows: A glass tube N is provided with a column of mercury $n$, and with upper and lower contacts 43 and 44, the lower contact being in constant engagement with the lower end of said mercury column. The upper contact 43 only engages the mercury when the latter expands sufficiently. With the circuit arrangement shown, as previously described, the said thermostat closes the circuit on high current, thereby permitting the use of a powerful relay, and then the current is immediately reduced in the thermostat. In this way the thermostat then opens the circuit on low current, thereby preventing sparking, and thus permitting the use of a mercury thermostat without danger of injury thereto, and without the necessity of using low currents which would tend to handicap the relays, etc.

In Fig. 12 a somewhat simplified and preferred form of relay contacts is shown, the construction and operation of which are as follows: The armature 45 is pivoted at 46, in the manner previously described, and is provided with a copper contact portion 47, and with a brass strip 48 on its upper surface. This brass strip engages the smooth lower end portion 49 of the relay magnet and thereby tends to obviate the difficulties which ordinarily result from residual magnetism, permitting the armature to drop back immediately upon the deënergizing of the magnet, but at the same time permitting the relay to hold the armature in attracted position when the current is reduced in the coil. A bracket 50 is suitably mounted in position and provided with a sheet metal member having arms 51 and 52, a spring 53 being applied to the pivot or hinge of this member to hold it in normal position. When the relay is operated the contact 47 first engages the arm 51, and the further motion of the armature 45 raises this arm 51, and also the arm 52, the latter being normally in engagement with the carbon block 54, as shown in the drawings. Thus the circuit is closed between 47 and 51 before the other circuit is opened between 52 and 53, and during the operation the contact 47 slides on the lower surface of the arm 51, thus giving the desired wiping effect to keep the contacts in proper condition. When the relay is deënergized, then the armature drops back and allows the contact arm 52 to reëngage the carbon block 54, thus closing the circuit of the main-switch in the manner previously described.

With reference to the construction of the main-switch and also the construction of the relay, there are certain advantages as follows: The inverted U-shaped member J of the main-switch serves to complete the magnetic circuit between the two poles of the magnet, it being observed that the armature $j$ is mounted upon the side portions of said bracket or member J, whereby the magnetic circuit is completely closed when the armature engages the pole piece or lower end of this magnet. This is also true of the relay construction, because when the relay armature 19, or the relay armature 45, engages the core of the relay coil the magnetic circuit is then closed through the inverted U-shaped member 30 between the two poles of the magnet. In this way the method of mounting the main-switch and relay electro-magnets serves also to provide a practically closed magnetic field for each magnet, thus reducing the air gap and increasing the strength and efficiency of the magnet in each case, whereby less current may be used, as will be readily understood by those skilled in the art.

From the foregoing, it will be seen that the main switch-coil G has a circuit extending between the ground and the source of current, which source of current, for all practical purposes, may be regarded as the heavy resistance I by which the current is fed to everything except the heating-circuit. The coil $f$ of the relay is in a circuit, therefore, extending parallel practically with the entire circuit of the coil G, as this circuit of the relay-coil extends around not only the coil G of said switch, but also around the contacts of the relay itself, whereby not only the coil G is in multiple with the coil of the relay, but also with practically the entire circuit of this main switch-coil.

Thus it will be seen that with the improved construction the apparatus does not operate on the principle of a relay-coil which is in shunt to a portion of the main switch-coil-circuit, which would involve the use of the relay-coil in series with the coil of the main switch, and which would necessitate the energizing of the relay through the coil of the main switch, so that current flowing through the coil of the main switch would pass through the relay-coil and the thermostat upon the closing of the circuit at the latter, and which would also involve a permanent path to ground from the trolley through the coil of the main switch. To the contrary, it will be seen that the improved construction, as herein shown and described, operates on the principle of a relay having its coil in multiple with the entire circuit of the main switch-coil, so that the relay-coil and the thermostat are connected in series with each other and in multiple with the coil of the main switch, whereby the closing of the circuit at the thermometer thermostat diverts a portion of the current around the main switch-coil, and so that the relay is not energized in series with the coil of the main switch. Furthermore, the herein shown and described circuit arrangement does not involve the principle of keeping the main switch deënergized by a shunt or short circuit around it, but to the contrary it depends upon the positive opening of the circuit of the main switch-coil by the relay-contacts 9 and 13 after the preliminary diversion of the current around the main switch through the thermostat, and after the further current-diverting effect obtained by closing circuit between the contacts 9 and 19 of said relay. Thus by employing the principle of energizing the relay-coil in multiple with the main switch-coil, instead of in series therewith, and by positively opening the circuit of the main switch, certain different and beneficial results are obtained, as previously explained, and as will be obvious to those skilled in the art.

What I claim as my invention is:

1. A thermo-electric regulator comprising a thermostat, a circuit including said thermostat, controlled thereby, so that said circuit is closed at said thermostat by a rising temperature and opened by a falling temperature, means to supply electric current to said circuit, and automatic devices to reduce the current in said thermostat after closure thereof by the rising temperature and before the opening of said circuit.

2. A thermo-electric regulator comprising a thermostat, a circuit including said thermostat, controllable thereby, so that said circuit is closed at said thermostat by a rising temperature and opened by a falling temperature, means to supply electric current to said circuit, automatic devices to prevent any increase of current in said thermostat after closure thereof by the rising temperature and before the opening of said circuit, and a system for any desired purpose under the control of said regulator.

3. The said regulator (substantially as set forth in claim 1), said devices including a normally open shunt extending around said thermostat, and a relay to close said shunt.

4. The said regulator (substantially as set forth in claim 2), said devices including a relay energized over said circuit in series with said thermostat.

5. The said regulator (substantially as set forth in claim 2), said devices including a normally open shunt extending around said thermostat and a relay to close said shunt.

6. The said regulator (substantially as set forth in claim 1), said devices including a relay energized over said circuit in series with said thermostat.

7. The said regulator (substantially as set forth in claim 1), said devices including a relay coil in said circuit, a shunt around said thermostat and coil, and normally open relay contacts operated by said coil to control said shunt.

8. The said regulator (substantially as set forth in claim 2), said devices including a relay coil in said circuit, a shunt around said thermostat and coil, and normally open relay contacts operated by said coil to close said shunt.

9. The said regulator (substantially as set forth in claim 1), said thermostat having an expansible body of mercury and contacts coöperating therewith to make and break the circuit by fluctuations of temperature.

10. The said regulator (substantially as set forth in claim 2), said thermostat having an expansible body of mercury and contacts coöperating therewith to make and break the circuit by fluctuations of temperature.

11. The said regulator (substantially as set forth in claim 1), said devices including a relay coil in said circuit, a normally open shunt around said thermostat and coil, and a resistance in said shunt to prevent a release of said relay before the thermostat is opened.

12. The said regulator (substantially as set forth in claim 2), said devices including a relay coil in said circuit, a normally open shunt around said thermostat and coil, and a resistance in said shunt to prevent a release of said relay before the thermostat is opened.

13. A thermo-electric regulator comprising a thermostat, a relay having its energizing circuit controlled by said thermostat, and a main switch having its energizing circuit controlled by said relay, said switch having a coil connected in multiple with said relay.

14. A thermo-electric regulator comprising a thermostat, a relay controlled by said thermostat and a main switch controlled by said relay, said switch having a coil connected in multiple with the coil of said relay, said thermostat and relay-coil being connected in series, and said relay having normally closed contacts in series with said switch-coil.

15. A thermo-electric regulator comprising a thermostat, a relay controlled by said thermostat and a main switch controlled by said relay, said switch having a coil connected in multiple with said relay, and a resistance, said relay having means to connect said resistance in multiple with said coil, and to then open the circuit of said coil, leaving said resistance in shunt of said relay and thermostat.

16. A thermo-electric regulator comprising a thermostat, a relay controlled by said thermostat and a main switch controlled by said relay, said switch having a coil connected in multiple with said relay, in combination with a heating circuit controlled by said switch, a source of current supply connected to said heating circuit, a resistance connected to feed current through the contacts of said relay to said coil, a heater for said heating circuit, and means to ground said regulator and heating circuit, said switch having contacts in said heating circuit between said heater and the ground.

17. The said regulator (substantially as set forth in claim 14), in combination with a heating circuit controlled by said switch, a source of current supply connected to said heating circuit, a resistance connected to feed current through the contacts of said relay to said switch-coil, a heater for said heating circuit, and means to ground said regulator and heating circuit, said switch having contacts in said heating circuit between said heater and the ground.

18. The said regulator (substantially as set forth in claim 15), in combination with a heating circuit controlled by said switch, a source of current supply connected to said heating circuit, a resistance connected to feed current through the contacts of said relay to said coil, a heater for said heating circuit, and means to ground said regulator and heating circuit, said switch having contacts in said heating circuit between said heater and the ground.

19. A thermo-electric regulator comprising a main switch, a ground circuit including the coil for operating said switch, a relay having normally closed contacts in said circuit, and a thermostat for controlling the energizing circuit of said relay to open and close said switch-circuit.

20. A thermo-electric regulator comprising a main switch, a ground circuit for operating said switch, a relay having normally closed contacts in said circuit, and a thermostat for controlling said relay to open and close said circuit, in combination with a heating circuit controlled by said main switch, said thermostat being arranged to open and close the circuit of said relay to ground, and a source of current supply connected to said regulator and heating circuit, said thermostat and relay and switch controlling all paths to ground.

21. A thermo-electric regulator comprising a main switch, a ground circuit for operating said switch, a relay having normally closed contacts in said circuit, and a thermostat for controlling said relay to open and close said circuit, and means to shunt said thermostat and switch before said circuit is opened by the relay.

22. A thermo-electric regulator comprising a main switch, a relay for controlling said switch, a thermostat for controlling said relay, a suitable board for grouping the said switch and relay together, a source of current supply, and a resistance for feeding the current to said switch-board, said resistance being remote from said switch-board.

23. A heating circuit, an electric switch comprising a magnet, an armature, a pivotal mounting for said armature, an arm carried by said armature, contact on said arm, means for engaging said contact to close said circuit, and a spring connection to yieldingly hold said arm and said armature against relative movement and permit said contact to slide on said means while the armature moves toward said magnet.

24. An electric switch having circuit closing contacts, a blow-out coil, and pole pieces for said coil, said contacts being disposed between said pole pieces, and a heating circuit including said contacts and coil in series.

25. A relay comprising an electro-magnet, a pivoted armature, a main circuit and a shunt for a portion of said circuit, and means operated by said armature to first close the shunt and then open said circuit.

26. The said relay (substantially as set forth in claim 25), said means including a stationary contact, a movable member normally engaging said contact, and a circuit closing element on said armature to engage said member, said member being included in both circuits.

27. The said relay (substantially as set forth in claim 25), said armature having side flanges, and said magnet having means to embrace said armature and thereby complete the magnetic circuit between the two poles thereof when the said armature is in attracted position.

28. An electro-magnet provided with an armature, a member for supporting said armature adjacent one pole of said magnet, said member being fixed to the other pole of said magnet, forming a magnetic circuit for said magnet, contacts operated by said armature, and a heating circuit controlled by said contacts.

29. A thermo-electric regulator comprising a main switch for controlling a heating-circuit, said switch being provided with an operating-coil having an energizing-circuit in multiple with the heating-circuit, a relay for controlling the switch-coil-circuit, said relay being provided with a coil which is in multiple with said entire switch-coil-circuit, so that the two coils and the heater are respectively in three separate parallel circuits, and a thermostat controlling said circuit of the relay-coil.

30. A thermo-electric regulator comprising a main switch-coil-circuit, a thermostat and relay coil connected in series to form a parallel circuit around the main switch-coil-circuit, said switch-coil-circuit including contacts of said relay, so that the relay controls the switch-coil-circuit, and said contacts being in multiple with the coil of said relay.

Signed by me at Chicago, Illinois, this 20th day of May, 1915.

LEE P. HYNES.